US007494626B2

(12) United States Patent  
Smith et al.

(10) Patent No.: US 7,494,626 B2
(45) Date of Patent: Feb. 24, 2009

(54) METHODS OF DELIVERING CATALYST SYSTEMS FOR PROPYLENE POLYMERIZATION

(75) Inventors: Lawrence Carl Smith, Houston, TX (US); James Charles Vizzini, Pasadena, TX (US); Ted Alexander Powell, El Lago, TX (US); Terry John Burkhardt, Kingwood, TX (US); Anthony Nicholas Speca, Kingwood, TX (US); Shiaw Tzuu Ju, Bellaire, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 204 days.

(21) Appl. No.: 11/488,267

(22) Filed: Jul. 18, 2006

(65) Prior Publication Data

US 2006/0257294 A1 Nov. 16, 2006

Related U.S. Application Data

(63) Continuation of application No. 10/668,723, filed on Sep. 22, 2003, now Pat. No. 7,232,868.

(60) Provisional application No. 60/417,254, filed on Oct. 9, 2002.

(51) Int. Cl.
*B01J 19/00* (2006.01)
(52) U.S. Cl. .................. 422/131; 422/244
(58) Field of Classification Search .......... 422/224, 422/131
See application file for complete search history.

(56) References Cited

U.S. PATENT DOCUMENTS

| 2,508,744 | A | | 5/1950 | Carlson et al. | 260/683.15 |
|---|---|---|---|---|---|
| 2,852,501 | A | | 9/1958 | Richard, Jr. et al. | 260/94.9 |
| 2,917,465 | A | * | 12/1959 | Begley | 502/6 |
| 2,956,995 | A | | 10/1960 | Knight | 260/94.9 |
| 3,004,086 | A | * | 10/1961 | Moon | 526/61 |
| 3,110,707 | A | * | 11/1963 | Bua et al. | 526/159 |
| 3,257,363 | A | * | 6/1966 | Miller et al. | 526/59 |
| 3,440,238 | A | | 4/1969 | Foglia et al. | 260/94.9 |
| 3,687,920 | A | * | 8/1972 | Johnson | 526/130 |
| 3,726,845 | A | * | 4/1973 | Nickerson | 526/159 |
| 3,779,712 | A | | 12/1973 | Calvert et al. | 23/288 |
| 4,011,383 | A | * | 3/1977 | Setterquist | 526/154 |
| 4,123,601 | A | * | 10/1978 | Kellum et al. | 526/79 |
| 4,232,138 | A | * | 11/1980 | Boone | 526/122 |
| 4,268,017 | A | | 5/1981 | Cole | 266/265 |
| 4,585,644 | A | | 4/1986 | Divis et al. | 423/450 |

(Continued)

FOREIGN PATENT DOCUMENTS

CH 425 733 12/1963

(Continued)

*Primary Examiner*—Walter D Griffin
*Assistant Examiner*—Natasha Young
(74) *Attorney, Agent, or Firm*—Kevin M. Faulkner; Shawn H. Foster

(57) ABSTRACT

A polymerization process is provided. For example, a polymerization process is described, including providing a catalyst slurry having a metallocene catalyst and a first oil, providing a transport medium including a second oil and combining the transport medium and the catalyst slurry to form a catalyst mixture. The process may further include introducing the catalyst mixture to a polymerization reactor and contacting olefin monomers with the catalyst mixture to polymerize the olefin monomers and form polyolefins.

23 Claims, 4 Drawing Sheets

U.S. PATENT DOCUMENTS

| | | | |
|---|---|---|---|
| 4,610,574 A * | 9/1986 | Peters | 422/131 |
| 5,128,294 A | 7/1992 | Buehler et al. | 502/111 |
| 5,326,855 A | 7/1994 | Kahn | 528/498 |
| 5,432,242 A | 7/1995 | Baron | 526/68 |
| 5,859,159 A * | 1/1999 | Rossi et al. | 526/170 |
| 5,968,864 A | 10/1999 | Shamshoum et al. | |
| 6,051,631 A | 4/2000 | Hottovy | 523/348 |
| 6,245,868 B1 | 6/2001 | Agapiou et al. | 526/88 |
| 6,346,584 B1 | 2/2002 | Wenzel et al. | 526/82 |
| 6,365,695 B1 | 4/2002 | Ramamurthy et al. | 526/352 |
| 6,368,999 B1 | 4/2002 | Speca | 502/402 |
| 6,391,819 B1 | 5/2002 | Agapiou et al. | 502/170 |
| 2001/0020072 A1 | 9/2001 | Agapiou et al. | 526/901 |
| 2001/0044506 A1 | 11/2001 | Mehta et al. | |
| 2002/0034464 A1 * | 3/2002 | Glenn et al. | 422/213 |

FOREIGN PATENT DOCUMENTS

| | | |
|---|---|---|
| EP | 0 646 603 | 9/1994 |
| EP | 747403 A1 | 12/1996 |
| EP | 0 776 691 | 6/1997 |
| GB | 2 274 110 | 7/1994 |
| WO | 01/05845 A1 | 1/2001 |
| WO | WO 02/06188 | 1/2002 |
| WO | 02/46246 A2 | 6/2002 |

* cited by examiner

METHODS OF DELIVERING CATALYST SYSTEMS FOR PROPYLENE POLYMERIZATION

CROSS REFERENCE TO RELATED APPLICATION

This application is a Continuation of U.S. patent application Ser. No. 10/668,723 filed Sep. 22, 2003, now U.S. Pat. No. 7,232,868 which claims the benefit of Provisional Application No. 60/417,254 filed Oct. 9, 2002, the disclosures of which are incorporated by reference.

FIELD OF INVENTION

Embodiments of the present invention generally relate to catalyst delivery for olefin polymerization.

BACKGROUND

Methods for forming polypropylene can include passing a stream having propylene monomers to a polymerization reactor to contact a catalyst and form polypropylene. However, problems may arise that reduce the catalyst efficiency. For example, high efficiency catalysts may experience a reduced efficiency when exposed to poisons that may be present in polymerization reactors. Conventional catalyst carriers, such as hexane, generally do not protect high activity catalyst systems from a reduction in efficiency when exposed to poisons. Therefore, it is desirable to provide a transport medium capable of maintaining catalyst efficiency in the presence of poisons.

SUMMARY OF THE INVENTION

In certain embodiments, a polymerization process includes providing a catalyst slurry having a metallocene catalyst and a first oil, providing a transport medium including a second oil and combining the transport medium and the catalyst slurry to form a catalyst mixture. The process may further include introducing the catalyst mixture to a polymerization reactor and contacting olefin monomers with the catalyst mixture to polymerize the olefin monomers and form polyolefins.

In certain embodiments, providing the catalyst slurry includes mixing the catalyst slurry in a first vessel to maintain the metallocene catalyst suspended in the first oil.

In certain embodiments, providing the catalyst slurry includes passing the catalyst slurry from a first vessel to a second vessel prior to combining the transport medium and the catalyst slurry, the second vessel having a substantially conical portion and a volume that is smaller than the volume of the first vessel. The process may further include passing the catalyst mixture through at least one meter configured to measure a catalyst addition rate. In yet other embodiments, providing the catalyst slurry includes monitoring the catalyst addition rate by disposing the catalyst slurry in a second vessel having a catalyst slurry inlet and a catalyst slurry outlet and measuring the change of level of catalyst slurry within the second vessel.

In certain embodiments, the catalyst slurry includes 25 wt % or less of the catalyst solids mixed with the first oil. In certain embodiments, the second oil flow rate is between 10 wt % and 100 wt % of the catalyst slurry flow rate.

In certain embodiments, combining the second oil and the catalyst slurry forms a catalyst mixture to provide a mixture with a lower viscosity than the viscosity of the catalyst slurry.

In certain embodiments, the metallocene catalyst has an activity of 500 gPP/(gcat*hr) or more.

In certain embodiments, the metallocene catalyst is supported.

In certain embodiments, the first oil and the second oil include mineral oil. In yet other embodiments, the first oil and the second oil each have a kinematic viscosity of from 0.63 centistokes to 200 centistokes at 40° C.

In other embodiments, the polymerization process includes providing a catalyst slurry including a metallocene catalyst and a first mineral oil having a kinematic viscosity of from about 0.63 centistokes to 200 centistokes at 40° C., providing a transport medium including a second mineral oil, combining the transport medium and the catalyst slurry to form a catalyst mixture, introducing the catalyst mixture to a polymerization reactor and contacting propylene monomers with the catalyst mixture to polymerize the propylene monomers and form polypropylene.

DETAILED DESCRIPTION

Figure 1:
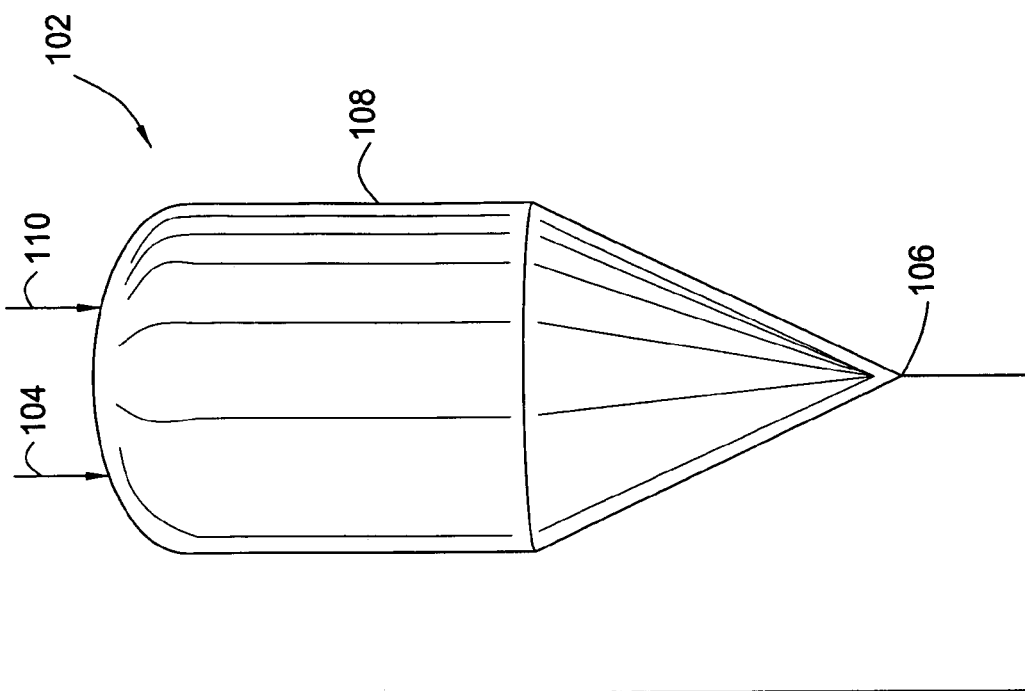
FIG. 1 illustrates a system that may be employed for providing a catalyst slurry to a polymerization reactor.
Figure 1:
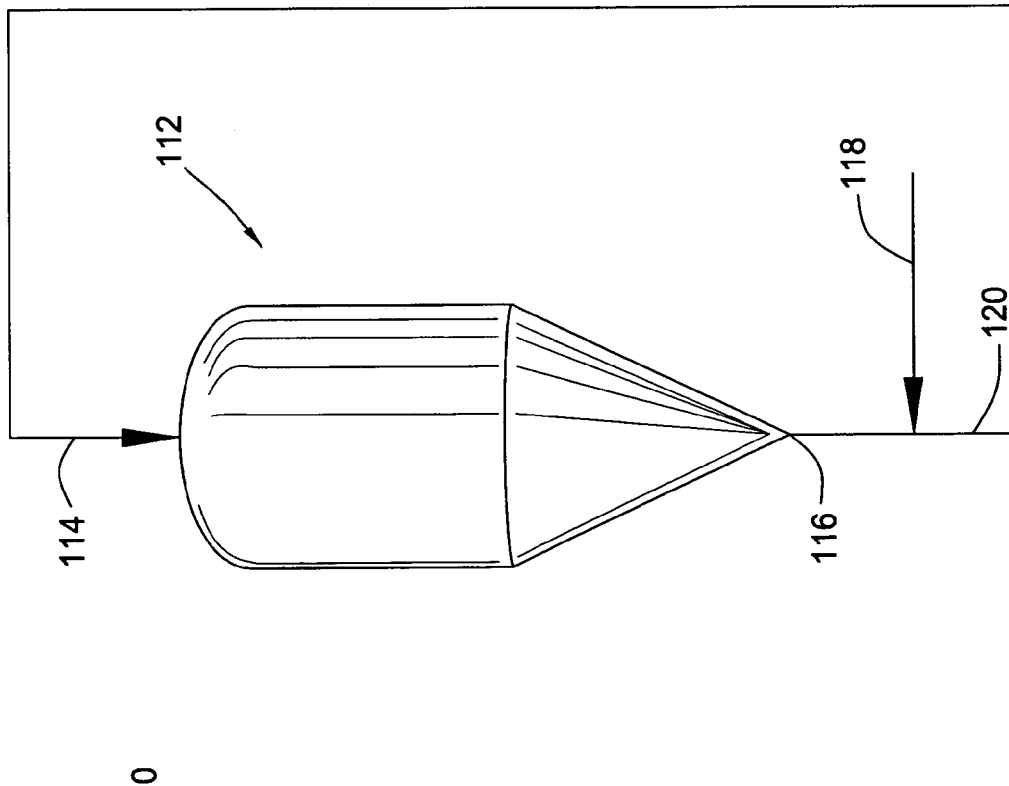
Figure 1:
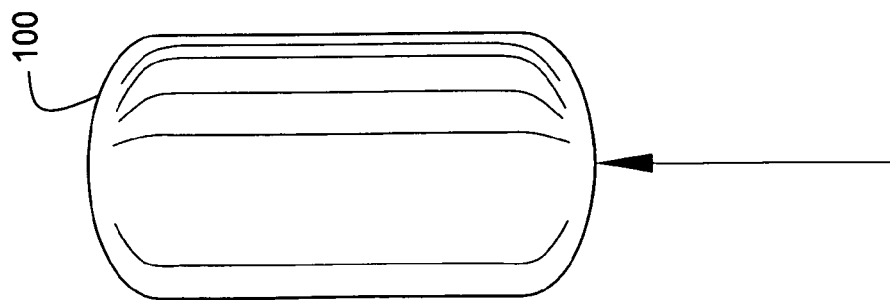

Various specific embodiments, versions and examples of the invention will now be described, including preferred embodiments and definitions that are adopted herein for purposes of understanding the claimed invention. It is understood, however, that for determining infringement, the scope of the "invention" will refer to any one or more of the appended claims, including their equivalents, and elements or limitations that are equivalent to those that are recited. References to specific "embodiments" are intended to correspond to claims covering those embodiments, but not necessarily to claims that cover more than those embodiments.

Embodiments of the invention include a polymerization process. The polymerization process includes passing a feed stream having olefin monomers through a polymerization reactor to polymerize the olefin monomers and form a polyolefin. The feed stream preferably includes olefin monomers, either alone or in combination, e.g., mixtures, having from 2 carbon atoms up to 16 carbon atoms per molecule. For example, the feed stream may include ethylene, propylene, butene, pentene, hexane, septene and/or octene. More preferably, the feed stream includes propylene monomers. In certain embodiments, the feed stream includes propylene monomers in an amount of from 85 wt % to 90 wt %. In other embodiments, the feed stream includes propylene monomers in an amount of 95 wt % or more.

The polymerization process may be carried out in any type of polymerization system including, but not limited to, a solution, gas phase or slurry process, or combinations thereof. Typically, in a gas phase polymerization process, a continuous cycle is employed wherein one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. The gaseous stream containing one or more monomers may be continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. Alternatively, other types of gas phase polymerization processes can also be used.

Slurry polymerization typically involves forming a suspension of solid, particulate polymer in a liquid polymerization medium, to which monomers and optionally hydrogen, along with catalyst, are added. The suspension (which may include diluent) can be intermittently or continuously removed from the reactor where the volatile components can be separated from the polymer and recycled, optionally after a distillation, to the reactor.

In a specific embodiment, a slurry process may be carried out continuously in one or more loop reactors. The catalyst as a slurry or as a dry free flowing powder can be injected regularly to the reactor loop, which can itself be filled with circulating slurry of growing polymer particles in a diluent. Hydrogen, optionally, may be added as a molecular weight control. The reactor may be maintained at a pressure of from 27 bar to 45 bar, or preferably from 36 bar to 43 bar and at a temperature in the range of from 38° C. to 121° C., or preferably from 60° C. to 105° C. Reaction heat can be removed through the loop wall since much of the reactor is in the form of a double-jacketed pipe. The slurry may exit the reactor at regular intervals or continuously to a heated low pressure flash vessel, rotary dryer and a nitrogen purge column in sequence for removal of the diluent and all unreacted monomer and comonomers. The resulted hydrocarbon free powder can then be compounded for use in various applications. Alternatively, other types of slurry polymerization processes can be used.

In any of the types of polymerization processes described above, a catalyst is used to promote polymerization. Any catalyst capable of polymerizing polyolefins in a polymerization reactor is contemplated. For example, high activity metallocene catalyst systems, e.g., catalyst systems having an efficiency of 500 gPP/(gcat*hr) or more, may be utilized. Preferably, the catalyst has an efficiency of 2500 gPP/(gcat*hr) or more. Even more preferably, the catalyst has an efficiency of 3500 gPP/(gcat*hr) or more, and alternatively, 5000 gPP/(gcat*hr) or more. Useful catalysts are described in detail in U.S. Pat. No. 6,368,999, which catalyst descriptions are hereby incorporated by reference. In processes described herein, the amount of active metallocene is preferably 1.5 wt % or less and the amount of metal alkyl scavenger is 12 wt % or less of the metallocene catalyst. A catalyst having a low amount of active metallocene in combination with a low amount of metal alkyl scavenger, or no metal alkyl scavenger, has been discovered to have a high sensitivity to poisons, resulting in lower catalyst efficiencies, and therefore lower polyolefin product yield. Certain aspects described herein include providing increased catalyst efficiency.

Certain polymerization processes may employ Ziegler-Natta catalysts for a period of time, which may be followed by the use of metallocene catalysts for additional polymerizations. For example, the process may include contacting propylene monomers with a Ziegler-Natta catalyst system to form polyolefins. Contacting the propylene monomers with a Ziegler-Natta catalyst system may generate poisons in the product mixture. At least a portion of the product mixture may be recycled and combined with the propylene monomers to contact the Ziegler-Natta catalyst system. The process may further include stopping the introduction of Ziegler-Natta catalyst to the polymerization reactor to cease the polymerization. A metallocene catalyst system may then be passed to the polymerization reactor to polymerize the propylene monomers. In doing so, the metallocene catalyst efficiency may be reduced due to the poisons generated by the Ziegler-Natta polymerization process. For example, the activity of metallocene catalysts exposed to those poisons may be 50 gPP/(gcat*hr) or less. Although the specific poisons and poison levels can vary widely, the term "poisons", as used herein, refers to substances which reduce the catalyst efficiency, and specifically includes alcohols (e.g., methanol, isopropanol and ethanol) and halogen moeties (e.g., fluorides and organohalides such as methyl chloride).

In one or more embodiments, a polymerization process is provided that includes providing a catalyst slurry to a polymerization reactor, the catalyst slurry including a metallocene catalyst and a first oil. Suitable metallocene catalysts are represented by the formula:

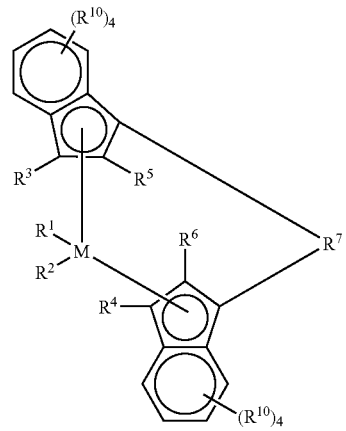

wherein: M is a metal of Group 4, 5, or 6 of the Periodic Table preferably, zirconium, hafnium and titanium, most preferably zirconium;

$R^1$ and $R^2$ are identical or different, preferably identical, and are one of a hydrogen atom, a $C_1$-$C_{10}$ alkyl group, preferably a $C_1$-$C_3$ alkyl group, a $C_1$-$C_{10}$ alkoxy group, preferably a $C_1$-$C_3$ alkoxy group, a $C_6$-$C_{10}$ aryl group, preferably a $C_6$-$C_8$ aryl group, a $C_6$-$C_{10}$ aryloxy group, preferably a $C_6$-$C_8$ aryloxy group, a $C_2$-$C_{10}$ alkenyl group, preferably a $C_2$-$C_4$ alkenyl group, a $C_7$-$C_{40}$ arylalkyl group, preferably a $C_7$-$C_{10}$ arylalkyl group, a $C_7$-$C_{40}$ alkylaryl group, preferably a $C_7$-$C_{12}$ alkylaryl group, a $C_8$-$C_{40}$ arylalkenyl group, preferably a $C_8$-$C_{12}$ arylalkenyl group, or a halogen atom, preferably chlorine; or a conjugated diene which is optionally substituted with one or more hydrocarbyl, tri(hydrocarbyl)silyl groups or hydrocarbyl, tri(hydrocarbyl)silylhydrocarbyl groups, said diene having up to 30 atoms not counting hydrogen;

$R^5$ and $R^6$ are identical or different, preferably identical, are one of a hydrogen atom, a halogen atom, preferably a fluorine, chlorine or bromine atom, a $C_1$-$C_{10}$ alkyl group, preferably a $C_1$-$C_4$ alkyl group, which may be halogenated, a $C_6$-$C_{10}$ aryl group, which may be halogenated, preferably a $C_6$-$C_8$ aryl group, a $C_2$-$C_{10}$ alkenyl group, preferably a $C_2$-$C_4$ alkenyl group, a $C_7$-$C_{40}$ arylalkyl group, preferably a $C_7$-$C_{10}$ arylalkyl group, a $C_7$-$C_{40}$ alkylaryl group, preferably a $C_7$-$C_{12}$ alkylaryl group, a $C_8$-$C_{40}$ arylalkenyl group, preferably a $C_8$-$C_{12}$ arylalkenyl group, a —$NR_2^{15}$, —$SR^{15}$, —$OR^{15}$, —$OSiR_3^{15}$ or —$PR_2^{15}$ radical, wherein: $R^{15}$ is one of a halogen atom, preferably a chlorine atom, a $C_1$-$C_{10}$ alkyl group, preferably a $C_1$-$C_3$ alkyl group, or a $C_6$-$C_{10}$ aryl group, preferably a $C_6$-$C_9$ aryl group;

$R^7$ is

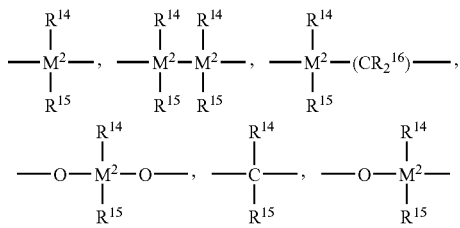

—$B(R^{14})$—, —$Al(R^{14})$—, —Ge—, —Sn—, —O—, —S—, —SO—, —$SO_2$—, —$N(R^{14})$—, —CO—, —$p(R^{14})$—, or —$P(O)(R^{14})$—;

wherein: $R^{14}$, $R^{15}$ and $R^{16}$ are identical or different and are a hydrogen atom, a halogen atom, a $C_1$-$C_{20}$ branched or linear alkyl group, a $C_1$-$C_{20}$ fluoroalkyl or silaalkyl group, a $C_6$-$C_{30}$ aryl group, a $C_6$-$C_{30}$ fluoroaryl group, a $C_1$-$C_{20}$ alkoxy group, a $C_2$-$C_{20}$ alkenyl group, a $C_7$-$C_{40}$ arylalkyl group, a $C_8$-$C_{40}$ arylalkenyl group, a $C_7$-$C_{40}$ alkylaryl group, or $R^{14}$ and $R^{15}$, together with the atoms binding them, form a cyclic ring;

preferably, $R^{14}$, $R^{15}$ and $R^{16}$ are identical and are a hydrogen atom, a halogen atom, a $C_1$-$C_4$ alkyl group, a $CF_3$ group, a $C_6$-$C_8$ aryl group, a $C_6$-$C_{10}$ fluoroaryl group, more preferably a pentafluorophenyl group, a $C_1$-$C_4$ alkoxy group, in particular a methoxy group, a $C_2$-$C_4$ alkenyl group, a $C_7$-$C_{10}$ arylalkyl group, a $C_8$-$C_{12}$ arylalkenyl group, or a $C_7$-$C_{14}$ alkylaryl group;

or, $R^7$ is represented by the formula:

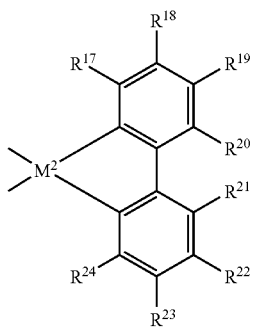

wherein: $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings; preferably, $R^{17}$ to $R^{24}$ are hydrogen;

$M^2$ is carbon, silicon, germanium or tin;

the radicals $R^3$, $R^4$, and $R^{10}$ are identical or different and have the meanings stated for $R^5$ and $R^6$, or two adjacent $R^{10}$ radicals are joined together to form a ring, preferably a ring containing from about 4-6 carbon atoms.

Preferably, the metallocene catalyst is one of the high efficiency metallocene catalysts described above. The catalyst slurry preferably includes 75 wt % or more of the first oil and 25 wt % or less of the metallocene catalyst. More preferably, the catalyst slurry includes from 90 wt % to 60 wt % first oil and from 10 wt % to 40 wt % metallocene catalyst. The first oil may be or include a mineral oil having a kinematic viscosity of from 0.63 centistokes (cSt) to 200 cSt at 40° C. Preferably, the mineral oil has a kinematic viscosity of from 50 cSt to 100 cSt, or from 45 cSt to 65 cSt, or from 25 cSt to 85 cSt. Preferably the first oil is or includes paraffinic mineral oil, such as Kaydol white oil commercially available from Witco Corporation The first oil may include mineral oil in amount greater than 95 wt %. More preferably the first oil includes 100 wt % mineral oil, i.e., the first oil is "pure" mineral oil. A schematic diagram that illustrates an example of the process is shown in FIG. 1.

The polymerization process preferably further includes providing a transport medium that includes a second oil. It has been discovered that providing the transport medium reduces catalyst particle attrition in process pumps. The second oil preferably has the same composition as the first oil, i.e., mineral oil. More preferably, the second oil has a viscosity that is lower than the viscosity of the catalyst slurry. For example, the second oil preferably has a kinematic viscosity of from 0.63 cSt to 200 cSt at 40° C. One purpose of the transport medium is to protect catalyst efficiency, e.g., to maintain the catalyst efficiency in comparison to catalyst systems not encountering poisons. The barrier properties of the transport medium preferably reduce the high activity catalyst system's sensitivity to poisons produced in the polymerization process.

FIG. 1 illustrates a system that may be employed for providing a catalyst slurry to a polymerization reactor 100. In order to maintain a homogeneous catalyst slurry, the catalyst slurry may be introduced to a first vessel 102 to maintain the metallocene catalyst suspended in the first oil. The first vessel 102 includes a mixer (not shown) configured to maintain uniform suspension of the metallocene catalyst particles in the first oil. Preferably, upon transfer from the first vessel 102 to another vessel or reactor, the catalyst slurry maintains the same solids concentration as upon introduction to the first vessel 102. For example, the first vessel 102 may include an anchor type mixer, e.g., a member shaped in the form of an anchor having a base proximate the base of the first vessel 102.

The first vessel 102 may include a catalyst slurry inlet 104, a catalyst slurry outlet 106 and a housing 108 having an upper portion and a lower portion. The lower portion may be disposed proximate the catalyst slurry outlet 106 and have a proximal end nearest the catalyst slurry inlet 104 and a distal end nearest the catalyst slurry outlet 106. The process may include passing a different catalyst to the polymerization reactor 100 at different times. Therefore, the first vessel 102 should be designed for complete displacement of the catalyst solids, e.g., flushing. The lower portion of the first vessel 102 should have a surface that is angled to encourage the catalyst to collect in a particular area. As used herein, "angled" is a plane greater than 0° and less than 90° from horizontal. In at least one embodiment, the surface is substantially conical. One way to flush the first vessel 102 is by passing a fluid, such as the first oil, through the first vessel 102, to remove any remaining catalyst slurry prior to filling the first vessel 102 with a different catalyst slurry. Accordingly, the proximal end preferably has a circumference that is greater than the circumference of the distal end, thereby facilitating cleaning of the first vessel 102 between polymerizations. The first vessel 102 may be sized based on individual system requirements. Mixing the catalyst slurry in the first vessel 102 operates to minimize catalyst particle attrition and provide for a higher catalyst solids concentration than systems not employing a catalyst slurry including a first oil.

The first vessel 102 may also have a first oil inlet 110 to receive additional amounts of the first oil to flush the first vessel 102. The first vessel 102 may be flushed in between polymerization runs. Alternatively, the first vessel 102 may be flushed prior to changing the catalyst to be disposed in the first vessel 102. As a result of the angled surface, e.g., the substantially conical portion, flushing the first vessel 102 results in improved removal of the catalyst slurry from the first vessel 102 in comparison to vessels not having a conical portion.

The process may further include passing the catalyst slurry from a first vessel 102 to a second vessel 112 prior to introducing the catalyst slurry into the polymerization vessel 100. The second vessel 112 may have a catalyst slurry inlet 114 and a catalyst slurry outlet 116 respectively configured to receive and discharge the catalyst slurry. Furthermore, the second vessel 112 may have a angled lower surface, e.g., a substantially conical portion, and a volume that is smaller than the volume of the first vessel 102. The second vessel 112 may be used to meter, e.g., measure, the catalyst addition rate into the polymerization vessel 100. As a result, the second vessel 112 volume need only be large enough to adequately meter the catalyst slurry and provide a sufficient volume of catalyst slurry to the polymerization vessel 100. Alternatively, metering may occur in the first vessel 102. When metering in the first vessel 102, the volume of the first vessel 102 should be small enough to adequately determine a fluid level in the first vessel 102. The metering may include passing the catalyst slurry through at least one flow monitoring device (not shown) configured to measure a catalyst addition rate. Alternatively, the catalyst addition rate may be monitored via gear pumps (not shown) disposed in the conduit operably connected to the catalyst slurry outlet 116. The catalyst slurry exiting the second vessel 112 generally has a low pressure. Therefore, the pressure of the catalyst mixture may be increased by passing the catalyst mixture through one or more gear pumps. A second oil may be introduced into the one or more gear pumps to prevent catalyst particle damage from the gear pumps. A preferred "flow monitoring device" can be what is commonly recognized or referred to in the polymerization reactor industry as a "meter"' including a member configured to measure the rate of the catalyst slurry flowing therethrough.

The transport medium 118 and the catalyst slurry are combined in the one or more gear pumps to form a catalyst mixture 120, which is subsequently introduced to the polymerization vessel 100. Preferably, the catalyst mixture 120 includes from 25 wt % to 75 wt % catalyst slurry and from 25 wt % to 75 wt % transport medium. The catalyst mixture 120 is then introduced to the polymerization reactor 100 so that the propylene monomers are contacted with the catalyst mixture 120 to polymerize the propylene monomers and form polypropylene. Polymerization occurs in polymerization vessel 100 as described above.

Feed Stream Purification

In one or more embodiments, a polymerization process is provided that includes contacting olefin monomers with a supported metallocene catalyst to polymerize the monomers and form a product mixture that includes macromers and/or polymers, unreacted or partially reacted monomers, and poisons. Preferably, the olefin monomers have from two to sixteen carbon atoms. More preferably, the olefin monomers include propylene, ethylene, or combinations thereof. The product mixture may include poisons in an amount of 2.5 ppm or more. Preferably, the supported metallocene catalyst system is a high efficiency metallocene catalyst system as described above.

The polymerization process may occur in a system utilizing a specific catalyst system for a polymerization run, such as a Ziegler-Natta catalyst system, and subsequently using a different catalyst system for another polymerization run, such as a metallocene catalyst system. For example, the process may include contacting propylene monomers with a Ziegler-Natta catalyst system to form polypropylene, thereby generating poisons in the product mixture. At least a portion of the product mixture may be recycled and combined with monomers to contact the Ziegler-Natta catalyst system. The process may further include stopping the flow of Ziegler-Natta catalyst to the polymerization reactor to cease the polymerization based on that particular catalyst system. A metallocene catalyst system may then be introduced to the polymerization reactor to polymerize the monomers. However, "poisons", such as organohalides and alcohols produced by the Ziegler-Natta catalysts are still present and may reduce the efficiency of the metallocene catalyst system. The product mixture including poisons may then be combined with the "fresh" propylene monomers to pass through the polymerization reactor and contact the metallocene catalyst system. The fresh propylene feed stream may include a small amount of impurities, which may also function as poisons. High efficiency, and therefore high yield, polymerization catalysts are particularly sensitive to poisons as a result of a low amount of metal alkyl scavenger present in the catalyst. Therefore, the poison level should be reduced prior to passing monomers through a polymerization process. Additionally, the process may further include removing a portion of the product mixture and passing it through a removal device including zeolite particles supported by a mesh screen, the zeolite particles having a pore size of from 6 Å to 16 Å, thereby preventing the passage of molecules having a size of greater than 16 Å therethrough. In doing so, at least a portion of poisons from the product mixture are transferred to the zeolite particles providing a purified monomer stream having poisons in an amount of 1 ppm or less. More preferably, the purified monomer stream has poisons in an amount of 0.5 ppm or less.

Preferably, the removal device (discussed in further detail below) includes molecular sieve particles having an average pore size of from 6 Å to 16 Å. As used herein, the term "molecular sieve" means a structure having a high surface area to prevent the passage of specified molecules therethrough, such as molecules having a critical diameter of up to 10 Å. For example, the molecular sieve unit may include an X type molecular sieve. A type X structured zeolite is characterized by Formula I below:

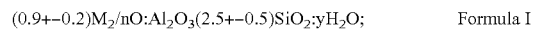

$$(0.9+-0.2)M_2/nO:Al_2O_3(2.5+-0.5)SiO_2:yH_2O; \quad \text{Formula I}$$

where M represents at least one cation having a valence of not more than 3, n represents the valence of M and y is a value up to 8 depending upon the identity of M and the degree of hydration of the crystal. The cation M may be one or more of a number of cations such as a hydrogen cation, an alkali metal cation, or an alkaline earth cation or other selected cations and is generally referred to as an exchangeable site. The type X zeolite can be present in the base material in concentrations generally ranging from 75 wt % to 90 wt % of the base material based on a volatile free composition. The remaining material in the base material preferably comprises amorphous silica or alumina or both, which are present in intimate mixture with the zeolite material.

More preferably, the molecular sieve unit includes a 13X molecular sieve commercially available from UOP of Des Plaines, Ill. The UOP 13X molecular sieve has an average pore size of 10 Å, which allows it to adsorb molecules having a critical diameter of smaller than 10 Å.

Contacting an input stream with the removal device described herein preferably results in a purified output stream having poisons in an amount of 1 ppm or less. In certain embodiments, the input stream has poisons in an amount of 2.5 ppm or more, and in certain other embodiments, the input stream has poisons in an amount of 5 ppm or more, e.g., up to 10 ppm or more poisons content. As a result of the low level of poisons present in the output stream, the metallocene catalyst has experienced an efficiency of greater than 3500 gPP/(gcat*hr), and alternatively, an efficiency of greater than 5000 gPP/(gcat*hr). In certain embodiments, the input stream is the recycle stream, prior to combining with the fresh feed stream, in which case the output stream is added to the fresh feed stream. Preferably, however the input stream is a combination of the recycle stream and the fresh feed stream.

Figure 2:
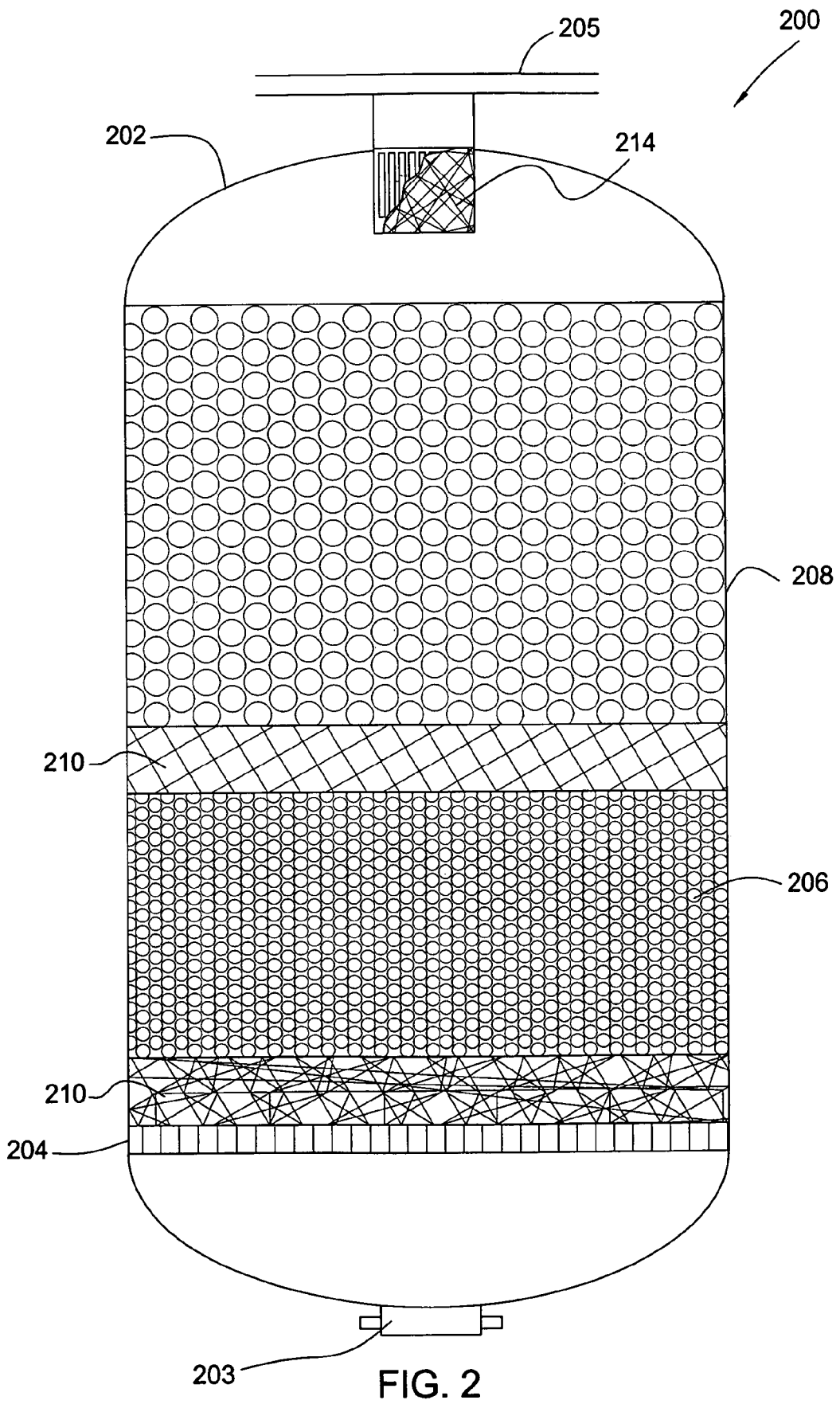
FIG. 2 illustrates an enlarged view of a specific example of a molecular sieve unit.

FIG. 2 illustrates a cross-sectional view of an embodiment of a removal device 200, useful with embodiments of the present invention. The removal device 200 includes a shell 202 in which at least one first support member 204 is positioned. The first support member 204 includes a number of perforations (e.g., holes) to allow a monomer stream flow through the first support member 204. The first support member 204 is preferably positioned between the feed inlet 203 and the feed outlet 205 of the removal device 200 and contacts a first portion of molecular sieve particles 206 which are positioned on a side of the first support member 204 closest to the feed outlet 205. The first support member 204 may include one or more screens 210 positioned thereon to further separate and support the first portion of molecular sieve particles 206. Mesh screen 210 may have a particle size of 8×12 mesh or less. The first portion of molecular sieve particles preferably has a size of 8×12 mesh or greater. The shell 202 may further include a screen 210 positioned above the first portion 206 to separate the first portion 206 from a second portion 208 of molecular sieve particles. The screen 210 may have a particle size of 4×8 mesh or less and the second portion of molecular sieve particles preferably has a particle size of greater than or equal to 4×8 mesh. The molecular sieve particles 212 are preferably uncrushed. The removal device 200 may also include a screen 214 provided to limit the amount of molecular sieve particles that flow out of the removal device 200 through the feed outlet 205.

Figure 3:
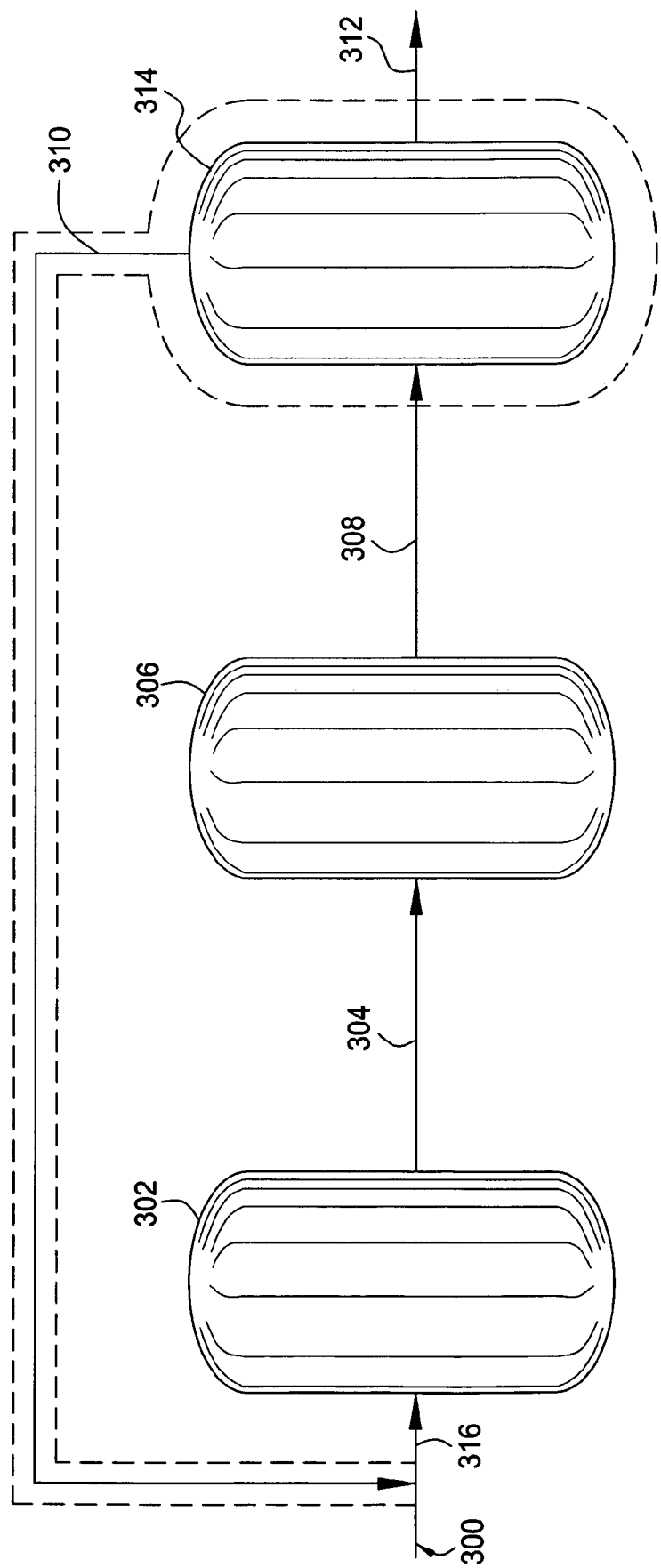
FIG. 3 illustrates a polymerization process wherein the recycle stream is mixed with an essentially pure, "fresh" feed stream to form an input stream prior to purification.

FIG. 3 illustrates a polymerization process wherein the recycle stream is mixed with a "fresh" feed stream, e.g., a monomer stream that has not been subjected to polymerization in the polymerization vessel 100, to form an input stream prior to purification. The process includes contacting the input stream, e.g., a first monomer stream 300, with one or more removal devices 302 to form a second monomer stream 304. The process further includes contacting the second monomer stream 304 with a metallocene catalyst system in a polymerization vessel 306 to polymerize the propylene to produce polyolefins in a third stream 308. Preferably, the first monomer stream 300 includes ethylene, propylene and higher alpha-olefin monomers having from four to sixteen carbon atoms. More preferably, the first monomer stream 300 includes propylene. More specifically, the first monomer stream 300 preferably includes fresh propylene. The first monomer stream 300 preferably is flowing to removal device 302 at a flowrate of from 3700 kg/hr to 56000 kg/hr. In addition to including fresh propylene, the first monomer stream 300 may include poisons, which reduce the efficiency of the metallocene catalyst system. It is preferred that these contaminants be less than 1 ppm of the mixture entering the polymerization vessel 306, e.g., the "input stream." Therefore, the first monomer stream 300 passes through the removal device 302 to remove at least a portion of the poisons from the propylene prior to subsequent polymerization.

As a result of passing through the one or more removal devices 302, the second monomer stream 304 has a reduced concentration of poisons in comparison to the first monomer stream 300. Preferably, the second monomer stream 304 has 1 ppm or less poisons. More preferably, the second monomer stream 304 includes less than 0.5 ppm poisons.

The polymerization process further includes contacting the second monomer stream 304 with a metallocene catalyst system to produce polyolefins in a third stream 308. Preferably, the second monomer stream 304 is entering the reactor 306 at a flow rate of from 3700 kg/hr to 56000 kg/hr. The third stream 308 preferably exits the reactor 306 at a flowrate of from 3700 kg/hr to 56000 kg/hr.

The polymerization process may further include separating un-polymerized monomers from the third stream 308 to form a fourth monomer stream 310, e.g., a recycle stream, and a polyolefin stream 312. The polyolefin stream 312 may be separated from the fourth monomer stream 310 via a separator 314, or by any other process known in the art for separating unreacted olefin monomers from formed polyolefins. The fourth monomer stream 310 includes unpolymerized monomers plus other inert liquids and gases. In addition, the fourth monomer stream 310 includes poisons, which may be present in an amount of 5 ppm or more. The fourth monomer stream 310 preferably has a flowrate of from 7 klb/hr to 105 klb/hr. The fourth monomer stream 310 may be subsequently combined with the first monomer stream 300 to form a mixed monomer stream 316. The first monomer stream 300 and the fourth monomer stream 310 may be combined in an amount determined by individual system requirements. Preferably, the first monomer stream 300 and the fourth monomer stream 310 are combined in equal amounts. When combined in equal amounts, the mixed monomer stream 316 may include poisons in an amount of 2.5 ppm or more. In the alternative, the fourth monomer stream 310 may directly contact the one or more molecular sieve units 302.

Catalyst Delivery

Figure 4:
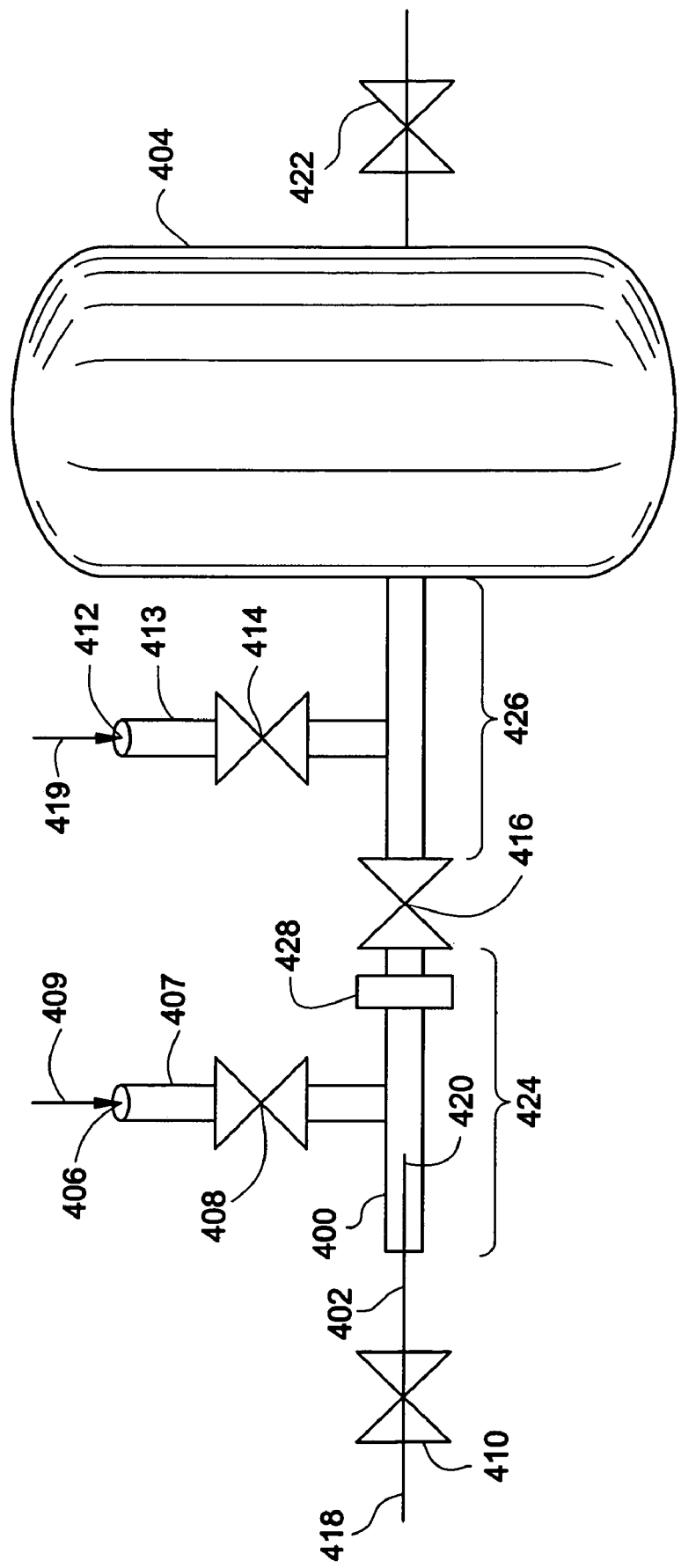
FIG. 4 illustrates an example of a system operably connected to a polymerization vessel to deliver catalyst to the polymerization vessel.

Certain embodiments include providing a conduit 400 that is operably connected to a polymerization vessel 404 to deliver catalyst to the polymerization vessel 404, as shown in FIG. 4. A catalyst can be introduced to the conduit 400 through a catalyst inlet 402. The catalyst inlet 402 may be a conduit having an inlet 418 and an outlet 420, the outlet being disposed within the conduit 400. The catalyst is generally suspended in a liquid phase. Alternatively, the catalyst may be in the form of free-flowing powder. The free-flowing powder may be conducted/transferred through the conduit 400 by an inert gas. The term "conduit" as used herein refers to any piping, etc. configured to pass a catalyst therethrough. Desirably, the conduit 400 is a pipe having a diameter of from 0.0120 m to 0.00635 m. The catalyst may include a metallocene system or a Ziegler-Natta system, or any other catalyst capable of polymerizing olefins. When using a metallocene catalyst, the method may include combining a carrier, such as an inert fluid, with the metallocene catalyst prior to introducing the metallocene catalyst to the polymerization vessel 404 to transport the metallocene catalyst through the conduit 400. The inert fluid may be an oil having a kinematic viscosity of from 0.63 cSt to 200 cSt at 40° C. When utilizing a Ziegler-Natta catalyst system, the method may include combining a liquid solvent, such as hexane, with the Ziegler-Natta catalyst prior to introducing the Ziegler-Natta catalyst to the polymerization vessel 404.

In addition, the conduit 400 preferably has a first monomer stream inlet 406. A first monomer stream 409 including propylene monomers can be introduced to the conduit 400 through the first monomer stream inlet 406 to provide a mixed catalyst stream (a mixture of catalyst and monomers) upon monomer contact with the catalyst, e.g., when the catalyst is injected into the first monomer stream 409. The monomer is preferably the same monomer as the monomer being polymerized in the polymerization vessel 404. For example, the monomer is preferably propylene. The mixed catalyst stream operates to increase the velocity of the catalyst entering the polymerization vessel 404. The first monomer stream inlet 406 may include a first conduit 407 having a first monomer valve 408. The first monomer valve 408 operates to provide a mixed catalyst stream having a velocity sufficient to prevent plugging of the conduit 400 during polymerization processes. The mixed catalyst stream velocity is dependent on individual system requirements, such as the conduit diameter.

During a typical polymerization operation, the conduit 400 may experience plugging, e.g., a stoppage of the catalyst flow through the conduit 400, in at least one portion of the conduit 400. Plugging may result from polymerization within the conduit 400 upon catalyst contact with the monomer used to transfer the catalyst into the reactor 404. As a result, at least a portion of the conduit 400 may need to be serviced to remove the plug. Complete replacement of the conduit 400 may require the polymerization process to cease while the conduit 400 is replaced. It is desirable that the polymerization continues while the conduit 400 is serviced, e.g., the flow of the catalyst passing through the conduit 400 may be terminated while maintaining the polymerization. Although polymerization vessels may include an alternate catalyst injection system 422, many vessels do not have the ability to prevent flow of the polymer into the conduit being serviced. Therefore, the conduit 400 may include a first portion 424 that may be removed upon at least partial plugging, or at any other time when the system requires maintenance. To determine when the conduit 400 needs to be replaced, e.g., upon plugging, the process may include monitoring the conduit 400 to identify plugging. Closing a first catalyst valve 410 and the first monomer valve 408 may stop the flow. Upon stopping the flow of the catalyst through the conduit 400, a second monomer stream 419 may be introduced to the conduit 426 through a second monomer stream inlet 412, which is located downstream of the first monomer stream inlet 406 and passed to the polymerization vessel 404. The second monomer stream 419 flows to the polymerization vessel 404 during the repair/replacement of the plugged conduit portion. The second monomer inlet 412 may include a second conduit 413 having a second monomer valve 414.

Alternatively, the second monomer stream 419 may flow through a second conduit 426 to the polymerization vessel 404, rather than flowing through a portion of the plugged conduit 400. The second monomer stream 419 may flow to the conduit 426 at a velocity substantially equal to the velocity of the first monomer stream 409. For example, the second monomer stream 419 may have a velocity that is from 50% to 150% of the first monomer stream velocity. Preferably, the second monomer stream 419 has a velocity that is from 80% to 120% of the first monomer stream velocity.

The section of the conduit 400 that experiences plugging, or any other section that should be removed/replaced is then removed (or the flow is diverted to a second conduit) and the removed section of the conduit 400 is replaced with a different conduit section. The conduit 400 may include a first catalyst valve 410 and a second catalyst valve 416, the first catalyst valve 410 being disposed in the first section 424 to regulate the flow of catalyst and the second catalyst valve 416 being disposed in a second section 426 between the first monomer stream inlet 406 and the second monomer stream inlet 412. The first valve 410 and the second valve 416 may include more than one valve and the first section 424 and a flange 428 may connect the second section 426 to the first section 424. The flange 428 provides easy removal of either portion for conduit maintenance. The second catalyst valve 416 is configured to hold a backpressure to prevent the flow of polymerizable propylene monomers into the conduit 400 from the polymerization vessel 404. Preferably, the second catalyst valve 416 is a tight sealing high-pressure valve. The valve pressure depends on individual reactor pressures.

The removed section may be the section of the conduit 400 between the first catalyst valve 410 and the second catalyst valve 416. Alternatively, the removed section may be the first section 424, e.g., the conduit section including the catalyst inlet 418 up to the flange 428. The conduit 400 preferably includes multiple sections, such as a section between the first catalyst valve 410 and the second catalyst valve 416, to accommodate removal of only a portion of the conduit 400. The multiple sections may be connected by methods known in the art for connecting the multiple sections, for example threads or flanges. The removed section may be rehabilitated for re-use. During maintenance, additional catalyst may flow to the reactor 404 via a second conduit 422. The second conduit 422 is essentially similar to the conduit 400. In the absence of an operable second conduit 422, the removable conduit 400 provides minimal production stoppage as a result of the continuous monomer flow to the reactor 404. Once the fouled section of conduit 400 is replaced, the catalyst flow is returned to the conduit 400 and the flow of the second monomer stream 419 can be terminated.

The foregoing methods, either alone or in combination, result in a deceased effect of poisons on metallocene catalyst systems. As a result, the metallocene catalyst systems experience increased efficiency.

Having now fully described this invention, it will be appreciated by those skilled in the art that the invention can be performed within a wide range of parameters within what is claimed, without departing from the spirit and scope of the invention. Where applicable all patents, applications, and publications cited herein, including those relied upon for priority, are herein incorporated by reference.

What is claimed is:

1. Apparatus for delivering catalyst slurry to a polymerization vessel comprising:

a first vessel comprising a first housing, a first catalyst slurry inlet, a first oil inlet and a first catalyst slurry outlet, the first vessel adapted to contain an amount of a catalyst slurry, the catalyst slurry comprising a quantity of catalyst particles and a first oil;

a mixing means to maintain particle dispersion of the catalyst particles within the catalyst slurry in the first vessel;

a second vessel comprising a second housing, a second catalyst slurry inlet and a second catalyst slurry outlet, the second vessel in fluid communication with the first vessel via the first catalyst slurry outlet and the second catalyst slurry inlet;

a means for feeding a transport medium to the second catalyst slurry outlet to form a catalyst mixture; and a polymerization vessel comprising a first monomer inlet and a third catalyst slurry inlet, the polymerization vessel in fluid communication with the second vessel via the second catalyst slurry outlet and third catalyst slurry inlet;

further comprising a first monomer stream comprising $C_2$ to $C_{16}$ alpha-olefins;

at least one removal device, the removal device adapted to remove poisons from the first monomer stream, wherein the at least one removal device comprises a third vessel and at least one molecular sieve material disposed in the third vessel, the third vessel comprising a second monomer feed inlet and a monomer feed outlet, and the third vessel in fluid communication with the polymerization vessel via the monomer feed outlet and the first monomer feed inlet.

2. The apparatus of claim 1, wherein the mixing means is disposed within the first vessel.

3. The apparatus of claim 1, wherein the first vessel further comprises an angled lower portion.

4. The apparatus of claim 3, wherein the angled lower portion is a substantially conical portion.

5. The apparatus of claim 1, wherein the second vessel has a volume less than that of the first vessel.

6. The apparatus of claim 1, wherein the second vessel further comprises an angled lower portion.

7. The apparatus of claim 6, wherein the angled lower portion is a substantially conical portion.

8. The apparatus of claim 1, further comprising: means for monitoring flow of the catalyst mixture from the second vessel to the polymerization vessel, wherein the means for monitoring is a pump.

9. The apparatus of claim 8, wherein the pump is a gear pump.

10. The apparatus of claim 1, wherein the at least one removal device further comprises at least one support member for supporting the at least one molecular sieve material.

11. The apparatus of claim 1, wherein the at least one molecular sieve material comprises a type X structured zeolite.

12. The apparatus of claim 1, further comprising at least one screen, the at least one screen sized to prevent transfer of the at least one molecular sieve material across the at least one screen.

13. The apparatus of claim 1, wherein the at least one molecular sieve material comprises a first molecular sieve material and a second molecular sieve material.

14. The apparatus of claim 1, wherein the first and second molecular sieve materials are, independently, each a type X structured zeolite.

15. The apparatus of claim 1, further comprising a retaining screen proximate the second monomer feed outlet and adapted to prevent transfer of the at least one molecular sieve material through the second monomer feed outlet.

16. The apparatus of claim 1, further comprising:
a first polyolefin mixture comprising at least a polyolefin and a monomer; and a separator comprising a polyolefin mixture inlet, a polyolefin stream outlet and a recycle stream outlet, the separator adapted to separate the first polymer mixture into a polyolefin stream comprising polyolefin and a recycle stream, the recycle stream being substantially free of polyolefin and the separator in fluid communication with the at least one removal device via at least the recycle stream outlet.

17. The apparatus of claim 1 further comprising: a means for determining the level of the catalyst slurry in the second vessel.

18. An apparatus for delivering catalyst to a polymerization reactor comprising:
a first catalyst stream comprising catalyst particles and a first oil;
a polymerization vessel;
a first catalyst isolation means for preventing flow of the first catalyst stream to the polymerization vessel;
a second catalyst isolation means for preventing flow of the first catalyst stream to the polymerization vessel;
at least one monomer stream comprising $C_2$ to $C_{16}$ alpha-olefins;
at least two monomer isolation means for preventing flow of the at least one monomer stream to the polymerization vessel;
a first conduit removably connected at a first end to the first catalyst isolation means, at a second end to the second catalyst isolation means and at a third end to one of the at least two monomer isolation means; and
a second conduit operably connected at one end to the second catalyst isolation means, at a second end to the polymerization vessel and at a third end to one of the at least two monomer isolation means.

19. The apparatus of claim 18, wherein the catalyst mixture comprises olefin polymerization catalyst, and wherein the olefin polymerization catalyst is a supported catalyst.

20. The apparatus of claim 18, wherein the first catalyst isolation means, the second isolation means and the at least two monomer isolation means are each, independently, selected from a valve and an in-line blind.

21. The apparatus of claim 18, further comprising:
a second catalyst stream comprising a catalyst mixture; and
a third catalyst isolation means for preventing flow of the second catalyst stream to the polymerization vessel.

22. The apparatus of claim 21, wherein the third catalyst isolation means is selected from a valve and an in-line blind.

23. The apparatus of claim 18, further comprising a flange disposed between the first conduit and the second catalyst isolation means.

* * * * *